United States Patent [19] [11] 4,096,842
Kurata [45] Jun. 27, 1978

[54] DEVICE FOR WINDING A SPIRAL SPRING TO START AN ENGINE

[75] Inventor: Noboru Kurata, Kamifukuoka, Japan

[73] Assignee: Honda Giken Kogyo Kabushiki Kaisha, Tokyo, Japan

[21] Appl. No.: 750,897

[22] Filed: Dec. 15, 1976

[30] Foreign Application Priority Data

Dec. 20, 1975 Japan .............................. 50-172608

[51] Int. Cl.[2] .......................... F02N 3/04; F03G 1/08

[52] U.S. Cl. ...................................... 123/179 S; 74/6; 74/142; 185/39; 185/43; 192/12 B; 192/89 A

[58] Field of Search ..................... 74/6, 140, 141, 142; 123/179 S; 185/39, 43, 41 A; 192/12 B, 89 A

[56] References Cited

U.S. PATENT DOCUMENTS

| | | | |
|---|---|---|---|
| 1,023,212 | 4/1912 | Mallins | 74/140 X |
| 1,249,775 | 12/1917 | Kramer | 74/141 |
| 1,936,554 | 11/1933 | Lansing | 123/179 S |
| 3,205,881 | 9/1965 | Hamman | 123/179 S |

*Primary Examiner*—Allan D. Herrmann
*Attorney, Agent, or Firm*—Haseltine, Lake & Waters

[57] ABSTRACT

A device for winding a spiral spring to start an engine of a construction such that a pedal shaft and a driving sprocket which is supported on the pedal shaft are connected each other in a freely rotatable manner through a clutch which is engaged and disengaged in accordance with forward and reverse rotations of the pedal shaft, that a ratchet pawl which permits the forward rotation of the pedal shaft and prevents the reverse rotation thereof is caused to be engaged with the outer peripheral teeth of the driving sprocket, and further that the driving sprocket and a driven sprocket which is provided on a starter shaft to be connected with a spiral spring are interlinked by a power transmission chain so as to cause the spiral spring to be wound around the starter shaft at the time of the forward rotation of the driving sprocket.

1 Claim, 4 Drawing Figures

DEVICE FOR WINDING A SPIRAL SPRING TO START AN ENGINE

BACKGROUND OF THE INVENTION

The present invention is concerned with a device fo winding a spiral spring to start an internal combustion engine in automotive vehicles such as motor-cycles, and the like.

SUMMARY OF THE INVENTION

It is an object of the present invention to provide an improved device for winding a spiral spring to be used in an automotive vehicle such as, for example, a motorcycle, in which the engine is started by rotation of an engine starting shaft due to accumulated force of the spiral spring.

It is another object of the present invention to provide an improved device for winding such spiral spring of a simple construction, in which accumulation of force in the abovementioned spiral spring can be carried out easily by a rotational operation effected by the oscillatory movement of a pedal shaft.

According to the present invention, briefly speaking, there is provided a device for winding a spiral spring to start an engine of a construction such that a pedal shaft and a driving sprocket which is supported on the pedal shaft are connected each other in a freely rotatable manner through a clutch which is engaged and disengaged in accordance with forward and reverse of the pedal shaft, that a ratchet pawl which permits the forward rotation of the pedal shaft and prevents the reverse rotation thereof is caused to the engaged with the outer peripheral teeth of the driving sprocket, and further that the driving sprocket and a driven sprocket which is provided on a starter shaft to be connected with a spiral spring are interlinked by a power transmission chain so as to cause the spiral spring to be wound around the starter shaft at the time of the forward rotation of the driving sprocket.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for the purpose of illustration and description, and are shown in the accompanying drawings, forming a part of the specification.

In the drawing.

DETAILED DESCRIPTION OF PREFERRED EMBODIMENT

Figure 1:
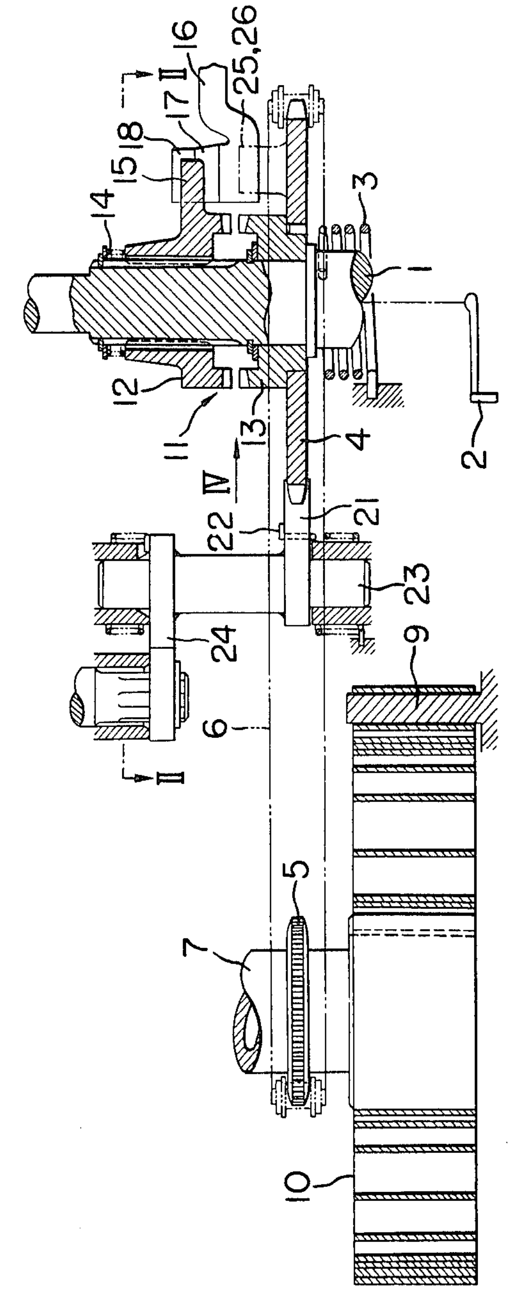
FIG. 1 is a plan view, partly in longitudinal cross-section, showing one embodiment of the spiral spring winding device according to the present invention.

The present invention will now be described in detail in the following in reference to a preferred embodiment thereof shown in the accompanying drawing.

A numeral 1 refers to a pedal shaft which is supported on a machine frame of an engine (not shown) in a freely rotatable manner. The pedal shaft is rotatable back and forth, or orcillatable, in the arrow directions *a* and *b* by a pushing force to be imparted to a starting pedal 2 connected to the outward end of the pedal shaft 1, and a torsional torque of a return spring 3 consisting of a coil spring.

On the outer periphery of this pedal shaft 1, there is fitted a driving sprocket 4 in a freely rotatable manner. On the other hand, a driven sprocket 5 is integrally formed on the outer periphery of a starting shaft 7 to be connected with a crank shaft of the engine (not shown) by way of an over-running clutch. Then, both driving and driven sprockets 4 and 5 are interconnected each other by means of a power transmission chain 6. Further, the inner end of a spiral spring 10 is connected with the starting shaft 7 and the outer end thereof is engaged with a fixed engaging member 9 provided on the machine frame of the engine.

Between the pedal shaft 1 and the driving sprocket 4, there is provided a clutch 11 which disengages in accordance with the oscillating movement of the pedal shaft 1 in the direction of the arrow marks *a* and *b*, in the following manner.

Figure 3:
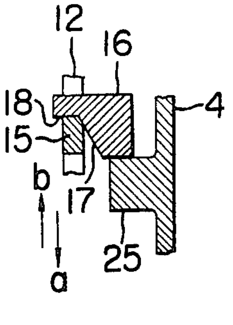
FIG. 3 is a cross-sectional view of a part of the spiral spring winding device shown in FIG. 2 taken along the line III—III therein.
Figure 4:
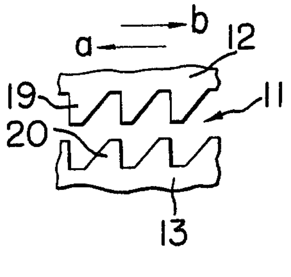
FIG. 4 is an enlarged view of another part of the spiral spring winding device shown in FIG. 1, when viewed from the direction indicated by an arrow mark IV therein.

That is to say, a driven clutch member 13 is integrally formed at one side of the driving sprocket 4, in opposition to which a driving clutch member 12 to be energized by a clutch spring 14 toward the driven clutch member 13 is spline-connected to the pedal shaft 1 in a freely slidable manner. The driving clutch member 12, as its integral part, an actuating arm 15 which projects in the radial direction from one side thereof. A cam surface 17 which is formed at the tip end part of a control arm 16 to be supported on the machine frame of the engine is engaged with the side surface of the actuating arm 15 facing the side of the driven clutch member 13. The cam surface 17 has an inclined face which is so slanting as to approaching to the driven clutch member 13 in the rotational direction of the arrow mark *a* as shown in FIG. 3. A stop surface 18 to determine an ordinary stopping position of the pedal shaft 1 upon its receipt of the actuating arm 15 is integrally formed with the control arm 16 facing the actuating arm 15, and at the top position or level of the cam surface 17. Both driving and driven clutch members 12 and 13 have, on their opposing surface, crown teeth in the form of a saw tooth, as shown in FIG. 4. The clutch members are so constructed that, when they are engaged each other, the driving clutch member 12 becomes able to drive the driven clutch member 13 only when it rotates in the direction of the arrow mark *a*.

With the outer peripheral teeth of the driving sprocket 4, there is engaged a ratchet pawl 21 which permits the driving sprocket 4 to rotate in the direction of the arrow mark *a* and hinders its rotation in the direction of the arrow mark *b*. A spring 22 to effect the engagement between the sprocket teeth and the ratchet pawl is provided on a rotational shaft 23, one end of which is hooked on the pawl 21, and the other end of which is engaged with a stopper. This ratchet pawl 21 can be forcibly separated or disengaged from the driving sprocket 4 by operation of a release lever 24 fixed on one end part of the rotational axis 23.

Further, on the same side surface of the driving sprocket 4 where the driven clutch member 13 is provided, there are integrally formed a first and a second projections 25, 26, both of which are so arranged that they may respectively contact the upper and lower surface of the tip end part of the control arm 16 so as to stop the driving sprocket 4, while the spiral spring 10 is in a required wound state or in an unwound state.

In the following, the operation of the spiral spring winding device of the afore-described construction according to the present invention will be explained in reference to the illustrated embodiment.

At the time of starting the engine, the engine starting pedal 2 is first pushed repeatedly to impart the oscillating movement to the pedal shaft 1. In this case, by the rotation of the pedal shaft 1 in the direction of the arrow mark *a* of the pedal shaft 1 due to the pedal pushing operation, the actuating arm 15 of the driving clutch member 12 which constantly rotate together with the pedal shaft 1 shifts to a lower position or level of the cam surface 17. Then, along with this shifting of the actuating arm 15, the driving clutch member 12 is forwarded by the spring force of a clutch spring 14 to be meshed with the driven clutch member 13 with the consequence that the continuous rotation in the direction of the arrow mark *a* of the pedal shaft 1 is transmitted to the driving sprocket 4 through both driving and driven clutch members 12 and 13, and further to the connecting chain 6 and the driven sprocket 5. As the result of this transmission of the rotational force, the engine starting shaft 7 is rotated and the spiral spring 10 is wound around this engine starting shaft 7, whereby the driving force is accumulated in it.

Further, by the rotation in the direction of the arrow mark *b* of the pedal shaft 1 due to the restitutive force of the return spring 3, the driving clutch member 12 performs sliding action with respect to the driven clutch member 13. In other words, it rotates together with the pedal shaft 1 leaving the driving clutch member 13 therebehind, and, as the actuating arm 15 is pushed up toward the high position or level of the cam surface 17, the driving clutch member 12 retracts against the spring force of the clutch spring 14, whereby the engagement thereof with the driven clutch member 13 is released. During this period, the ratchet pawl 21 is engaged with the bottom or valley of one of the peripheral teeth of the driving sprocket 4 to prevent the driving sprocket 4 from its reverse rotation due to the accumulated force in the spiral spring 10.

Figure 2:
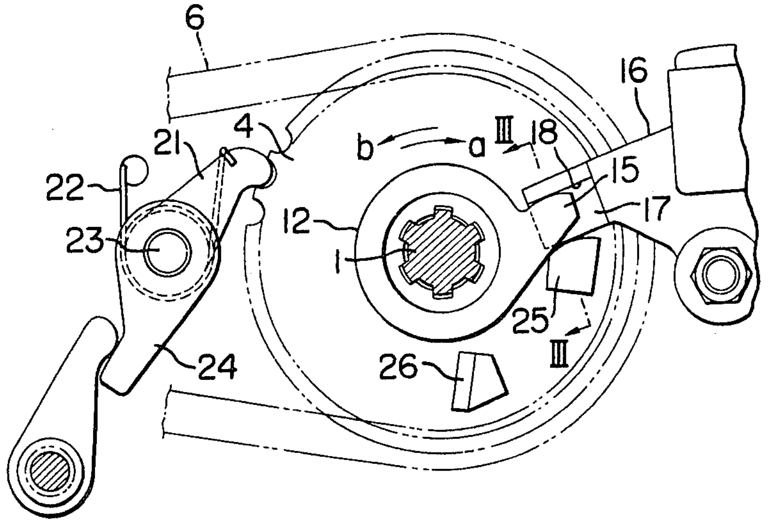
FIG. 2 is a side elevational view, partly in cross-section, of the spiral spring winding device in FIG. 1 taken along the line II—II therein.

By the repetition of these operations, the driving sprocket 4 is rotated at a certain definite rotational angle in the direction of the arrow mark *a*, and, when the second projection 26 provided at one side surface of the driving sprocket 4 contacts the upper surface of the tip end part of the control arm 16, as shown in FIG. 2, the spiral spring 10 is placed in a state of its having an adequate and sufficient spring force accumulation, whereby the pushing operation of the engine starting pedal 2 is completed.

Subsequently, the release lever 24 is operated to separate the ratchet pawl 21 from the outer peripheral teeth of the driving sprocket 4 to liberate the driving sprocket 4, whereupon the spiral spring 10 is also released to exert its accumulated force at once, by the powerful rotational torque of which the engine starting shaft 7 is subjected to rotation at a high speed to start the engine.

With exertion of this accumulated force from the spiral spring 10, the driving sprocket 4 is subjected to reverse rotation from the side of the driven sprocket 5, whereby it is given a rotation in the direction of the arrow mark *b*. When the first projection 25 integrally formed on one side surface of the driving sprocket 4 contacts with the lower surface at the tip end part of the control arm 16, as shown in FIG. 2, the rotation of the sprocket is stopped, whereby the unwinding quantity of the spiral spring is restricted, and a residual spring force can be still reserved in the spiral spring 10. At this time, since the clutch 11 is in the state of its being disconnected, the reverse rotation of the driving sprocket 4 is not transmitted to the engine starting pedal 2.

Thus, according to the present invention, the ratchet pawl 21 is engaged with the outer peripheral teeth of the driving sprocket 4 which is rotated in such a definite direction as to winding the spiral spring 10 for starting the engine with oscillatory movement of the pedal shaft 1, whereby the driving sprocket 4 is made to serve as a ratchet wheel for the reverse rotation preventive device to hinder unwinding or release of the spiral spring 10 during the winding operation thereof, hence the number of assembly parts can be reduced, and the overall construction of the device becomes simple. Further, since the pedal shaft 1 is so constructed that the connection with the driving sprocket 4 is interrupted by disconnection of the clutch 11 at its ordinary stoppage position, there is no risk at all of the pedal shaft 1 to rotate in the reverse direction at the time of discharging the accumulated force from the spiral spring 10. Accordingly, it becomes possible that the engine starting pedal 2 is always equipped on the pedal shaft 1, which facilitates the starting operation of the engine.

Although the present invention has been described in the foregoing with reference to a preferred embodiment thereof, it should be borne in mind that the embodiment is merely illustrative and not so restrictive, and that any change and modification may be made by those persons skilled in the art within the purview of the present invention as set forth in the appended claims.

What is claimed is:

1. An apparatus for winding a spiral spring to start an engine, employing a pedal shaft; a starting pedal connected to said pedal shaft; a driving sprocket rotatably mounted on said pedal shaft having driving teeth formed on the outer periphery thereof; clutch means mounted on said pedal shaft for respectively connecting and disconnecting said pedal shaft and said sprocket for integral or separate rotation in response to forward and reverse rotation of said pedal shaft; ratchet pawl means being engageable with said driving teeth for preventing reverse rotation of said sprocket to permit forward rotation thereof; starter shaft means adapted to be drivingly connected with an engine; and spiral spring means having an inner end secured to said starter shaft means and an outer end to a stationary member; a driven sprocket fixedly mounted on said starter shaft means being operatively connected to said driving sprocket through a power transmission chain, whereby said spiral spring is wound around said starter shaft means as said driving sprocket is rotated in a forward direction, said clutch means comprising: a driving clutch member mounted on said pedal shaft for axial sliding movement and being held against rotation relative thereto, said driving clutch member being provided with an actuating arm extending therefrom in a radial direction; a driven clutch member integrally secured to said driving sprocket in axially opposed relation therewith; a clutch spring for directing said driving clutch member into engagement with said driven clutch member; and cam means cooperating with said actuating arm of said driving clutch member for directing said actuating arm to cause disengagement of said driving and driven clutch members against the action of said clutch spring as said pedal shaft is rotated in a reverse direction to restrict further reverse rotation thereof.

* * * * *